US009330184B2

(12) United States Patent
Thornley et al.

(10) Patent No.: US 9,330,184 B2
(45) Date of Patent: May 3, 2016

(54) METHODS AND SYSTEMS FOR MACHINE LEARNING TO DISCOVER APPLICATION COMPATIBILITY STATUS

(71) Applicant: Citrix Systems, Inc., Fort Lauderdale, FL (US)

(72) Inventors: David Greggory Thornley, Algonquin, IL (US); Sheldon Ferdinand Lachambre, Harold Wood (GB)

(73) Assignee: Cltirix Systems, Inc., Fort Lauderdale, FL (US)

( * ) Notice: Subject to any disclaimer, the term of this patent is extended or adjusted under 35 U.S.C. 154(b) by 131 days.

(21) Appl. No.: 14/094,697

(22) Filed: Dec. 2, 2013

(65) Prior Publication Data

US 2015/0154277 A1    Jun. 4, 2015

(51) Int. Cl.
*G06F 17/00* (2006.01)
*G06F 17/30* (2006.01)
*G06F 9/445* (2006.01)

(52) U.S. Cl.
CPC ............ *G06F 17/30867* (2013.01); *G06F 8/60* (2013.01)

(58) Field of Classification Search
CPC ................................. G06F 17/30; G06F 17/00
USPC ................................................... 707/600–899
See application file for complete search history.

(56) References Cited

U.S. PATENT DOCUMENTS

| 5,974,254 | A | 10/1999 | Hsu |
| 6,366,876 | B1 | 4/2002 | Looney |
| 8,401,973 | B1 * | 3/2013 | Biswas et al. ................... 705/59 |
| 2004/0210885 | A1 | 10/2004 | Wang et al. |
| 2005/0028143 | A1 | 2/2005 | Aridor et al. |
| 2006/0015807 | A1 | 1/2006 | Chellis et al. |
| 2008/0301639 | A1 | 12/2008 | Bell et al. |
| 2010/0235823 | A1 | 9/2010 | Garbers et al. |
| 2010/0333068 | A1 | 12/2010 | Niimura et al. |
| 2011/0321014 | A1 | 12/2011 | Nagoria et al. |
| 2012/0210294 | A1 | 8/2012 | Gores |
| 2013/0054703 | A1 * | 2/2013 | Neill et al. .................... 709/206 |
| 2013/0152046 | A1 | 6/2013 | Salecker et al. |
| 2014/0297592 | A1 | 10/2014 | Ohtake et al. |
| 2014/0380341 | A1 | 12/2014 | Geimer et al. |
| 2015/0169319 | A1 | 6/2015 | Ahmed et al. |
| 2015/0169320 | A1 | 6/2015 | Ahmed et al. |

(Continued)

OTHER PUBLICATIONS

Citrix Systems Inc.; "AppDNA 6.1 Advanced Feature Guide"; 2012; 84 pages.

(Continued)

*Primary Examiner* — Isaac M Woo
(74) *Attorney, Agent, or Firm* — Finnegan, Henderson, Farabow, Garrett & Dunner, LLP

(57) ABSTRACT

A system and method is provided for discovering application compatibility status, the method being performed by one or more processors, the method comprising receiving a request for determining compatibility of a first application with a platform and organizing a plurality of data points associated with the first application into a plurality of elements. The method also comprises comparing the plurality of elements with a plurality of elements associated with one or more analyzed applications, wherein the one or more analyzed applications have been previously analyzed for compatibility with the platform. The method further comprises identifying a compatibility status of the first application with the platform based on the comparison; and providing, for display, the compatibility status of the first application.

30 Claims, 13 Drawing Sheets

(56) References Cited

U.S. PATENT DOCUMENTS

2015/0261653 A1 9/2015 Lachambre et al.
2015/0317235 A1 11/2015 Lachambre et al.

OTHER PUBLICATIONS

Citrix Systems Inc.; "AppDNA 6.1 Basic User Guide"; 2012; 86 pages.

International Search Report and Written Opinion dated Sep. 30, 2014; PCT Application PCT/US2013/072696; 10 pages.
International Search Report and Written Opinion dated Jun. 2, 2015; PCT Application PCT/US2015/019766; 9 pages.
O'Donnell, G; "Smarts Application Discovery Manager 5.0: Accelerating Server/Data Center Consolidations, Application Migrations, and CMDB Projects"; Jan. 1, 2007; Presentation at EMC World Conference; Orlando, Florida; 22 pages.

* cited by examiner

APPLICATION HEURISTIC DATA POINTS

External — 350: Context
- Usage / utilization /
- Users / machines

Runtime — 360: App
- Runtime external: network / DB / remote / dependencies
- Runtime internal: performance / resources

Static — 370: App
- Relationships / dependencies
- API calls / imports / exports
- Files / locations / registry
- Install logic / conditions / actions

Static — 380: OS
- Relationships / dependencies
- API calls / imports / exports
- Files / locations / registry

FIG. 3B

| # | Application Name | Manufacturer | Version | Desktop Compatibility Manager Windows 7 SP1 | SBC Manager XenApp Hosted TS | Server Compatibility Manager Server 2008 R2 SP1 | App-V | XenApp Streamed | Virtualisation Manager Module RAG | 64bit Manager 64 Bit | Complexity RAG | Overall RAG |
|---|---|---|---|---|---|---|---|---|---|---|---|---|
| 1 | ActiveSync | Microsoft | 3.7 | R | G | R | R | R | R | R | 8 | R |
| 2 | Analysts_Notebook | i2 | 6.01 | R | A | R | R | R | R | R | 8 | R |
| 3 | APOLLO2010_DM_Full.exe_2012_03_12 20_57_45_i0005.msi | Unknown | 5.1.2600 | G | G | G | G | G | G | G | 8 | G |
| 4 | ArcGIS Desktop 10 | Environmental Systems Research Institute, Inc. | 10.0.2414 | G | G | G | G | G | G | G | 8 | R |
| 5 | avast! Antivirus | Alwil | 4.7 | R | R | R | R | R | R | R | 8 | R |
| 6 | BBC Ticker | BBC | 1.0.1.7 | G | A | G | G | A | G | G | 0 | A |
| 7 | Client Letter | Top Down Systems, Corporation | 2.4.2 | A | A | A | A | G | A | A | 8 | A |
| 8 | Corel PHOTO-PAINT 8 | Corel | 6.0 | A | A | R | A | A | A | A | 0 | A |
| 9 | DameWare NT Utilities | DameWare Development | 3.72.0.0.0 | R | A | A | A | A | R | R | 8 | R |
| 10 | Documentum Desktop | Documentum, a division of EMC. | 5.3.0.204 | A | G | A | A | A | G | R | 8 | R |
| 11 | Dreamweaver_MX | Macromedia | 6.0 | G | A | G | A | A | A | G | 8 | A |
| 12 | FAS 100 Asset Accounting | Sage | 12.0 | A | G | A | A | R | G | G | 8 | R |
| 13 | Firefox | Mozilla Corporation | 3.5.3.0 | G | G | A | A | R | A | A | 8 | R |

METHODS AND SYSTEMS FOR MACHINE LEARNING TO DISCOVER APPLICATION COMPATIBILITY STATUS

FIELD

The present disclosure generally relates to application compatibility with different platforms. Exemplary embodiments relate to methods and systems for machine learning to discover application compatibility status for a given platform.

BACKGROUND

Today's rapidly changing technology requires application users to migrate from one platform to another, such as Windows 7™ to Windows 8™, or changes to runtime environment, such as App-V™, every couple of years. For every instance of such migration, users have to validate each application to ensure compatibility of the application for the migrated platform. This process might need to be repeated for every major and/or minor new release of a given platform. As users demand new and improved features, the frequency of updating platforms increases, thereby also increasing the importance of the migration from one platform or version to another.

Such migration is critical for enterprise users running thousands of applications for any given project on any given platform. And each such application can be associated with many different algorithms. That is, verification of applications and their associated algorithms for any given platform can be very complex and time consuming. Traditionally, such migration and verification is implemented manually, costing the organization a significant number of man hours (or months or years) and cost.

While a number of current techniques can be used to perform an accurate analysis to detect compatibility of an application across different platforms, the current techniques often involve manual testing of hundreds of applications using diagnostic tools such as process monitoring and debuggers to discover any defects. A disadvantage for such a process is the specialized knowledge required by a person in-charge of the testing.

Another drawback with the current techniques is the occasional false positive showing that an application is not compatible with a platform, whereas in reality that application is indeed compatible. A reduction in the percentage of false positives is useful for application users, especially when migrating between platforms.

BRIEF DESCRIPTION OF THE DRAWINGS

Reference will now be made to the accompanying drawings showing exemplary embodiments of this disclosure. In the drawings:

FIG. 3B is a block diagram illustrating exemplary application heuristic data points, consistent with embodiments of the present disclosure;

FIG. 7 is a block diagram showing an exemplary embodiment of application compatibility system performing a reporting of an application compatibility status, consistent with embodiments of the present disclosure;

DETAILED DESCRIPTION OF DRAWINGS

Reference will now be made in detail to the exemplary embodiments consistent with the embodiments disclosed herein, the examples of which are illustrated in the accompanying drawings. Wherever possible, the same reference numbers will be used throughout the drawings to refer to the same or like parts. In this disclosure, the phrase "platform" is used to convey that a platform can be any software platform. For example, a software platform can be a Windows™-based platform (e.g., Windows 8™), an Apple™-based platform (Mac OS X™), or a mobile-based platform such as Apple iOS™. It will be understood, in some embodiments, that platform can also mean a hardware platform.

The present disclosure generally relates to application compatibility to different platforms. Exemplary embodiments relate to methods and systems for machine learning to discover application compatibility status for a given platform.

Figure 1:
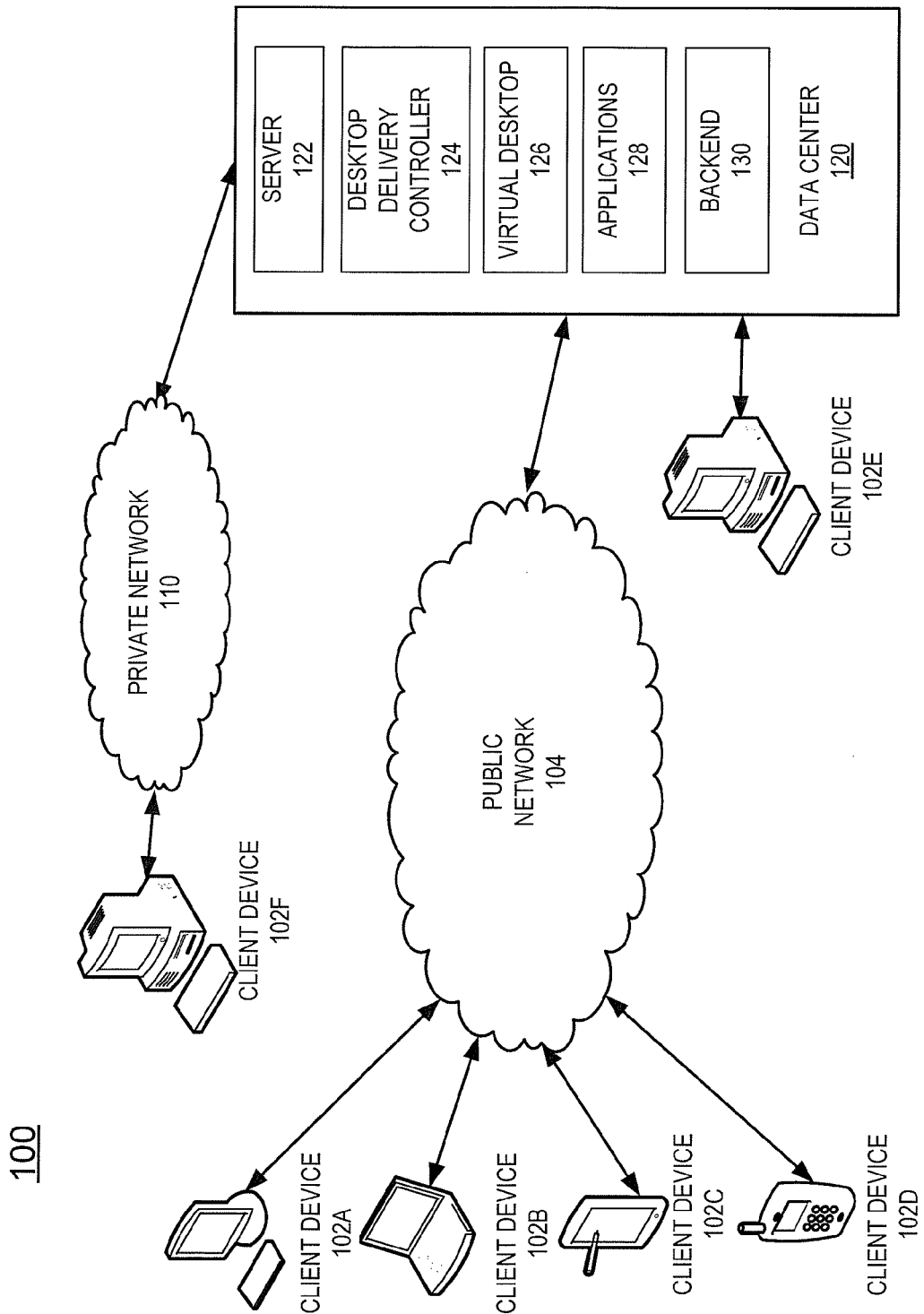
FIG. 1 is a block diagram of an exemplary network environment, consistent with embodiments of the present disclosure.

FIG. 1 is a block diagram of an exemplary network environment 100. While exemplary network environment 100 is directed to a virtual network environment, it is appreciated that the network environment can be any type of network that communicates using packets. Network environment 100 can include one or more client devices 102A-F, a public network 104, a private network 110, and a data center 120.

One or more client devices 102A-F are devices that can acquire remote services from data center 120 through various means. Client devices 102A-F can communicate with data center 120 either directly (e.g., client device 102E) or indirectly through a public network 104 (e.g., client devices 102A-D) or a private network 110 (e.g., client device 102F). When client device 102 communicates through public network 104 or private network 110, a communication link can be established. For example, a communication link can be established by public network 104, thereby providing a client device (e.g. client devices 102A-D) access to data center 120. A communication link can also be established by private network 110, thereby providing a client device (e.g. client device 102F) access to data center 120. While client devices 102A-F are portrayed as a computer (e.g., client devices 102A, 102E, and 102F), a laptop (e.g., client device 102B), a tablet (e.g., client device 102C), and a mobile smart phone (e.g., client device 102D), it is appreciated that client device 102 could be any type of device that communicates packets to and from data center 120. For example, client devices 102A-F can be referred to as a computing device, an electronic device, a mobile device, a communications device, and the like.

Public network 104 and private network 110 can be any type of network such as a wide area network (WAN), a local area network (LAN), or a metropolitan area network (MAN). As an example, a WAN can be the Internet or the World Wide Web, and a LAN can be a corporate Intranet. Public network 104 and private network 110 can be a wired network, a wireless network, or a combination of both.

Data center 120 can be a central repository, either physical or virtual, for the storage, management, and dissemination of data and information pertaining to a particular public or private entity. Data center 120 can be used to house computer systems and associated components, such as one or physical servers, virtual servers, and storage systems. Data center 120 can include, among other things, one or more servers (e.g., server 122), a desktop delivery controller 124, a virtual desktop 126, applications 128, and a backend system 130.

Server 122 can be an entity represented by an IP address and can exist as a single entity or a member of a server farm. Server 122 can be a physical server or a virtual server. In some embodiments, server 122 can include a hardware layer, an operating system, and a hypervisor creating or managing one or more virtual machines. Server 122 can provide one or more services to an endpoint. These services can include providing one or more desktops operating on one or more platforms and one or more applications 128 to one or more endpoints (e.g., client devices 102A-F). For example, the one or more applications 128 can include Windows™- or SAP™-based applications and computing resources. In some embodiments, server 122 can provide application compatibility services. For example, application compatibility between one platform to another (e.g., Window 7™ to Windows 8™) can be performed at server 122. Moreover, the compatibility services can include application migration services.

Desktop delivery controller 124 can be a device that enables delivery of services, such as virtual desktops 126 to client devices (e.g., client devices 102A-F). Desktop delivery controller 124 can provide functionality required to manage, maintain, and optimize all virtual desktop communications. In some embodiments, desktop delivery controller 124 can control, manage, maintain, or optimize the provisioning of applications 128. In some embodiments, controlling, managing, maintaining, or optimizing the provisioning of applications 128 can be implemented for one or more platforms. That is, desktop delivery controller 124 can enable delivery of application migration and compatibility services for one or more platforms.

In some embodiments, one or more virtual desktops 126 can provide one or more applications 128. Virtual desktops 126 can include hosted shared desktops allowing multiple users to access a single shared remote-desktop-services desktop, virtual desktop infrastructure desktops allowing each user to have their own virtual machine, streaming disk images, a local virtual machine, individual applications (e.g., one or more applications 128), or a combination thereof. In some embodiments, applications 128 can be associated with one or more platforms. That is, one or more virtual desktops 126 can provide one or more applications 128 that can be used to verify application compatibility and application migration corresponding to a platform.

Backend system 130 can be a single or multiple instances of computer networking hardware, appliances, or servers in a server farm or a bank of servers. Backend system 130 can interface directly or indirectly with server 122. For example, backend system 130 can include Microsoft™ Active Directory, which can provide a number of network services, including lightweight directory access protocol (LDAP) directory services, Kerberos-based authentication, domain name system (DNS) based naming and other network information, and synchronization of directory updates amongst several servers. Backend system 130 can also include, among other things, an Oracle backend server, a SQL Server backend, and/or a dynamic host configuration protocol (DHCP). Backend system 130 can provide data, services, or a combination of both to data center 120, which can then provide that information via varying forms to client devices 102 or branch office 140 (not shown).

Figure 2A:
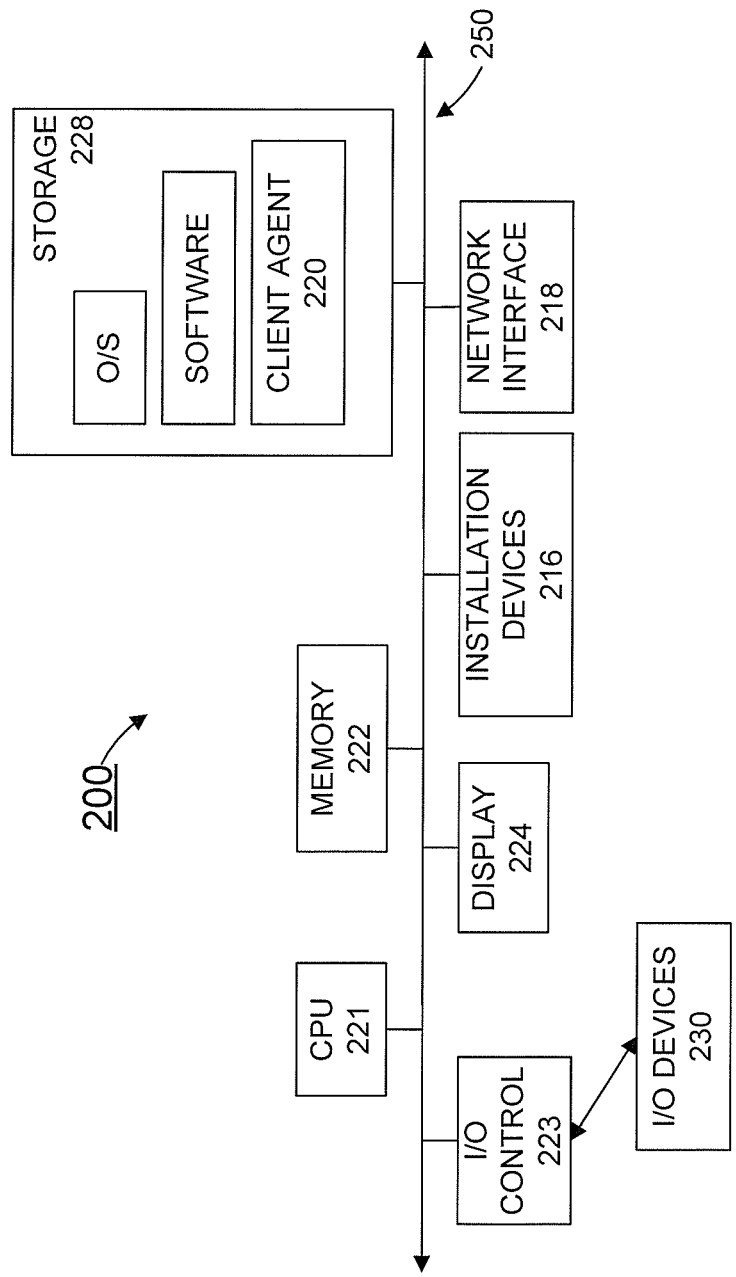
FIGS. 2A-2B are block diagrams of an exemplary computing device, consistent with embodiments of the present disclosure.
Figure 2B:
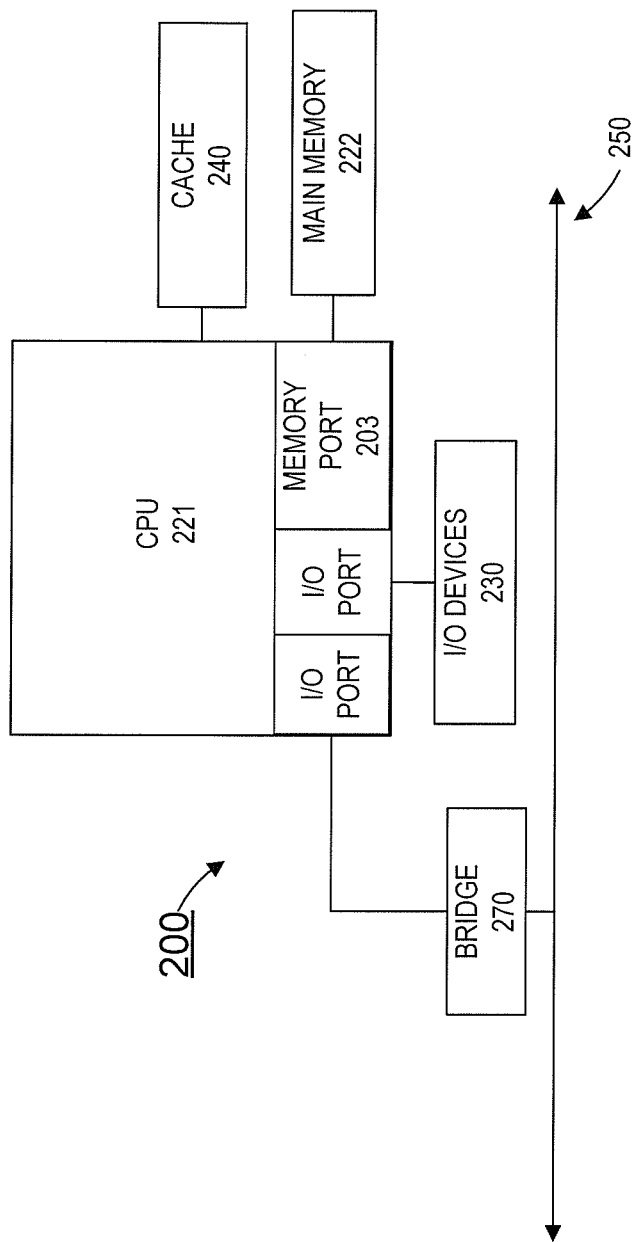

As shown in FIGS. 2A-2B, each computing device 200 (such as server 122 or a client device interfacing with server 122) includes a central processing unit (CPU) 221 and a main memory 222. CPU 221 can be any logic circuitry that responds to and processes instructions fetched from the main memory 222. CPU 221 can be a single or multiple microprocessors, field-programmable gate arrays (FPGAs), or digital signal processors (DSPs) capable of executing particular sets of instructions stored in a memory (e.g., main memory 222) or cache (e.g., cache 240). The memory includes a tangible non-transitory computer-readable medium, such as a flexible disk, a hard disk, a CD-ROM (compact disk read-only memory), MO (magneto-optical) drive, a DVD-ROM (digital versatile disk read-only memory), a DVD-RAM (digital versatile disk random-access memory), or a semiconductor memory. Main memory 222 can be one or more memory chips capable of storing data and allowing any storage location to be directly accessed by CPU 221. Main memory 222 can be any type of random access memory (RAM), or any other available memory chip capable of operating as described herein. In the exemplary embodiment shown in FIG. 2A, CPU 221 communicates with main memory 222 via a system bus 250. Computing device 200 can also include a visual display device 224 and an input/output (I/O) device 230 (e.g., a keyboard, mouse, or pointing device) connected through I/O controller 223, both of which communicate via system bus 250. One of ordinary skill in the art would appreciate that CPU 221 can also communicate with memory 222 and other devices in manners other than through system bus 250, such as through serial communication manners or point-to-point communication manners. Furthermore, I/O device 230 can also provide storage and/or an installation medium for the computing device 200.

FIG. 2B depicts an embodiment of an exemplary computing device 200 in which CPU 221 communicates directly with main memory 222 via a memory port 203. CPU 221 can communicate with a cache 240 via a secondary bus, sometimes referred to as a backside bus. In some other embodiments, CPU 221 can communicate with cache 240 via system bus 250. Cache 240 typically has a faster response time than main memory 222. In some embodiments, such as the embodiment shown in FIG. 2B, CPU 221 can communicate directly with I/O device 230 via an I/O port. In further embodiments, I/O device 230 can be a bridge 270 between system bus 250 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

As shown in FIG. 2A, computing device 200 can support any suitable installation device 216, such as a floppy disk drive for receiving floppy disks such as 3.5-inch, 5.25-inch disks or ZIP disks; a CD-ROM drive; a CD-R/RW drive; a DVD-ROM drive; tape drives of various formats; a USB device; a hard-drive; or any other device suitable for installing software and programs such as any client agent 220, or portion thereof. Computing device 200 can further comprise a storage device 228, such as one or more hard disk drives or redundant arrays of independent disks, for storing an operating system and other related software, and for storing application software programs such as any program related to client agent 220. Optionally, any of the installation devices 216 could also be used as storage device 228.

Furthermore, computing device 200 can include a network interface 218 to interface to a LAN, WAN, MAN, or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. Network interface 218 can comprise a built-in network adapter, network interface card, PCMCIA network card, card bus network adapter, wireless network adapter, USB network adapter, modem or any other device suitable for interfacing computing device 200 to any type of network capable of communication and performing the operations described herein.

Figure 3A:
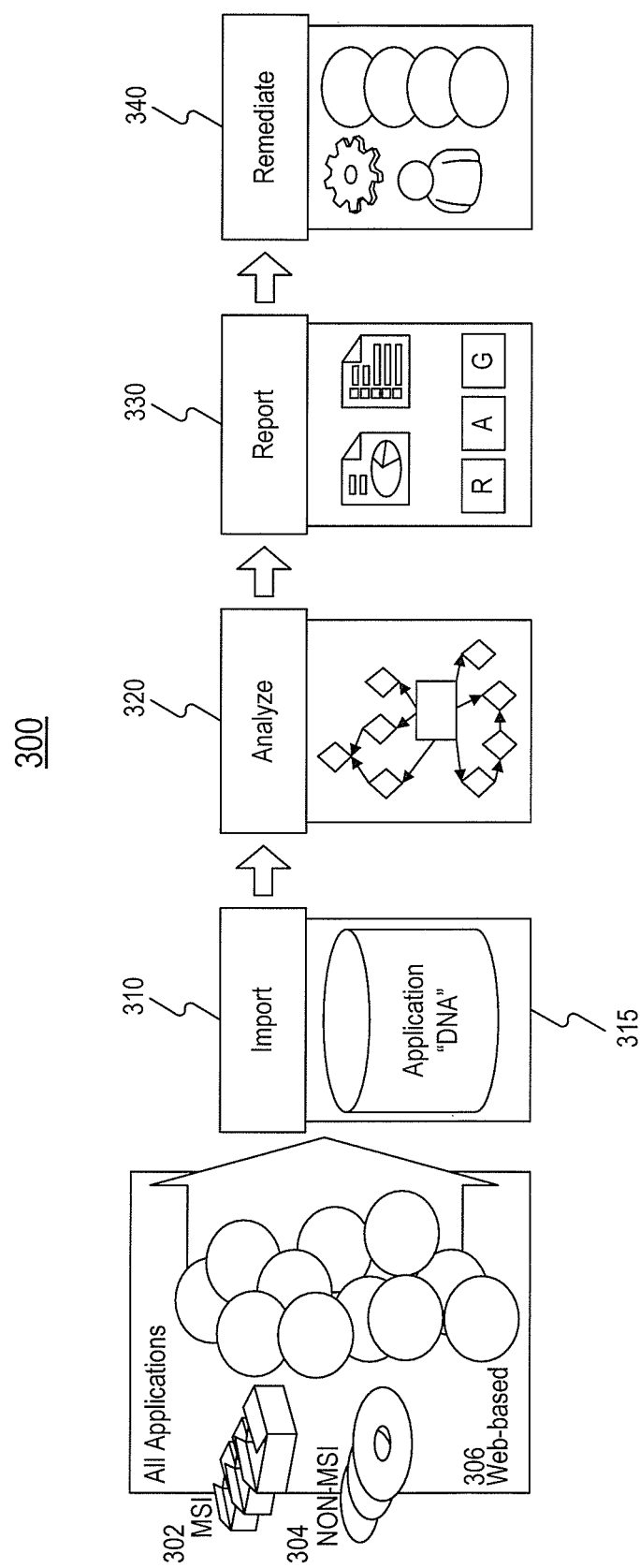
FIG. 3A is a block diagram of an exemplary process implementing an application compatibility system, consistent with embodiments of the present disclosure.

FIG. 3A depicts a block diagram of an exemplary process 300 implementing an application compatibility system. Exemplary process 300 can comprise steps including importing applications 310, analyzing the imported applications 320, generating reports 330, and remediating 340. Applications can be the raw material for the application compatibility system. When applications are imported, the application compatibility system can interrogate each application's files, registry entries, and application programming interface ("API") usage to expose the application's "DNA."

Each application can include a plurality of data points, which can be referred to as the application's DNA. In some embodiments, the data points of the application's DNA can be based on heuristics. For example, each application can include over 68,000 data points. An example of these data points is illustrated in FIG. 3B. As shown in FIG. 3B, these data points can include information associated with an application's static data 370 and also runtime data 360. Application's static data 370 can include information associated with install logic, install conditions, and/or install actions. Such data can also include information associated with application's files, registry settings, and/or configuration settings. It can further include information associated with API calls, API imports, and/or API exports. Additionally, static data can include information associated with relationships and/or dependencies within an application. Runtime data 360 of application's DNA can include either runtime internal data regarding performance and resources, or runtime external data regarding dependencies between network, database, etc. These data points can also include an operating system's static data 380. For example, operating system's static data can include information associated with operating system's files, registry settings, and/or configuration settings. It can also include information associated operating system's API calls, API imports, and/or API exports. Additionally, operating system's static data can also include information associated with relationships and/or dependencies of an operating system. These data points can also include information associated with external context 350. For example, external context 350 can include information associated with users and/or machines used by the users. External context 350 can also include information associated with usage and/or utilization of application compatibility system resources.

Figure 4:
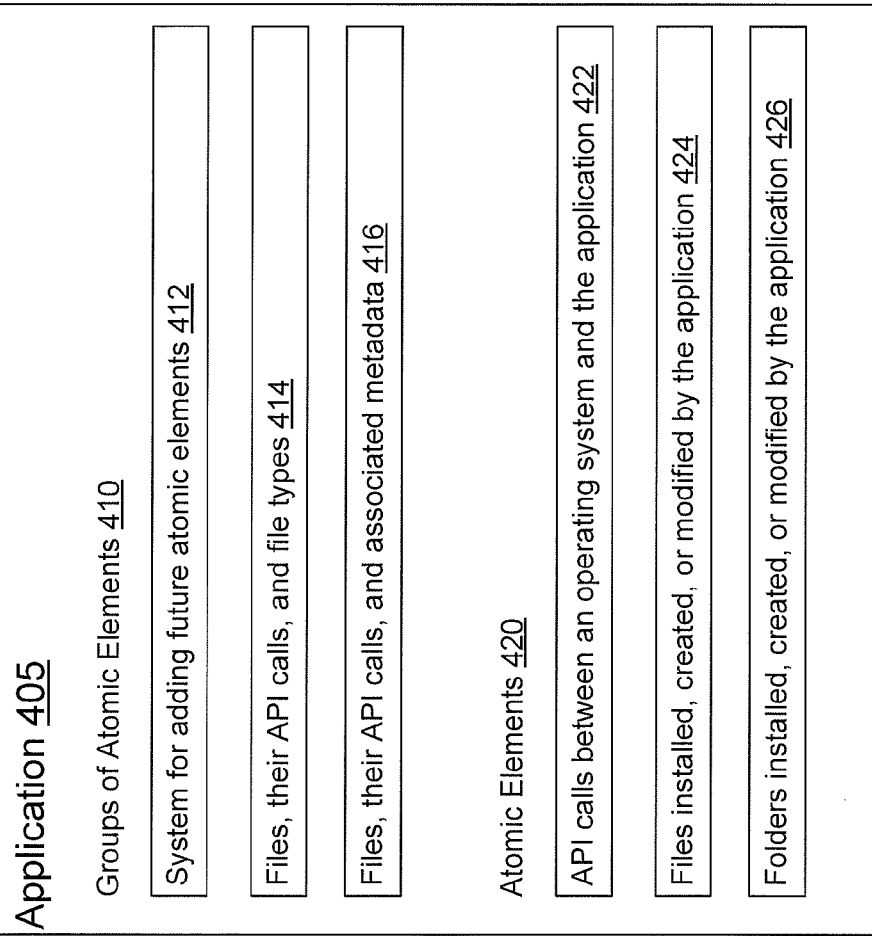
FIG. 4 is a block diagram illustrating exemplary application organization and application compatibility system, consistent with embodiments of the present disclosure.

In some exemplary embodiments, an application's DNA can be organized into elements, which can be referred to as "atomic elements." An example of these atomic elements is illustrated in FIG. 4. As shown in FIG. 4, in some embodiments, atomic elements of an application can comprise at least one of the following: API calls between an operating system and the application 422; files that are either installed, created, or modified by the application 424; or folders that are either installed, created, or modified by the application 426. Although not shown in FIG. 4, atomic elements of an application can also comprise at least one of the following: registry keys that are either installed, created, or modified by the application; registry values that are either installed, created, or modified by the application; API calls between the application and another application; meta data information associated with the files of an application; or information associated with a system for adding new atomic elements. It will be understood that the above-listed atomic elements are merely exemplary and application's DNA can be organized into any number of atomic elements. For example, an application can include over 68,000 data points that can comprise its DNA.

In some embodiments, an application's DNA can be organized into groups of atomic elements. An example of these groups of atomic elements is illustrated in FIG. 4. In some embodiments, two or more atomic elements can be combined to form a group of atomic elements. For example, as shown in FIG. 4, a group of atomic elements can comprise API calls associated with a plurality of files. Such an exemplary group of atomic elements can comprise a combination of API calls between a first file and a second file of the plurality of files, and API calls between one file of the plurality of files and an operating system. In some embodiments, groups of atomic elements can comprise information associated with a system for adding new atomic elements 412; or files types associated with one or more files 414; or meta data associated with one or more files 416. It will be understood that the above-listed group of atomic elements are merely exemplary and application's DNA can be organized into any number of groups of atomic elements.

In some embodiments, an application's DNA can be organized into containers (not shown in FIG. 4) and sub-containers (not shown in FIG. 4). In some embodiments, a container can be a group of atomic elements. For example, an exemplary group of atomic elements, as depicted in FIG. 4, can comprise a combination of API calls between a first file and a second file of the plurality of files, and API calls between one file of the plurality of files and an operating system. In some embodiments, containers can be used for a bulk-level compatibility verification, which can potentially generate a signature for the whole container or group of atomic elements. This signature can be used to rapidly match against, for example, "Known Good DNA" or "Known Bad DNA" across a larger sample (e.g., a container at a time) in one comparison that can improve efficiency of the compatibility verification process, as opposed to atomic-level verification, where the compatibility verification proceeds one atomic element at a time. A status of Known Good DNA can signify that all atomic elements associated with an application are known to be compatible with a target platform. A status of Known Bad DNA can signify that at least one atomic element associated with an application is known to be not compatible with a target platform. It will be understood that the exemplary bulk-level verification can also be performed with other statuses of atomic elements, such as "Suspect DNA," which is discussed below.

In some embodiments, containers can be defined to comprise a collection of files residing in a folder, and a sub-container could be a sub-folder residing in the folder. In some embodiments, a similar parallel can exist for registry hives, and keys, and their sub-keys. The installation package, for example, and Runtime redistributable like the Microsoft Visual C++ Runtime, can form one of these meta groups or atomic elements. It will be understood that the above-listed definitions of containers and sub-containers are not limiting and merely exemplary.

Referring back to FIG. 3A, applications imported in importing step 310 can comprise any kind of application including, but not limited to, desktop applications (e.g., MSI applications 302, non-MSI applications 304), or web based applications (for example, web applications 306). MSI applications 302 can include, for example, Microsoft Installer™ or Windows Installer™ based applications. That is, MSI applications 302 can be applications that use a .msi file (Microsoft Installer™ or Windows Installer™) in the process of installation. Non-MSI applications 304 can be applications that use an interface other than Microsoft Installer™ or Windows Installer™ interface for installation, such as Microsoft App-V™ or a custom developed setup.exe file.

Importing step 310 can be implemented differently between importing desktop applications and web applications. For example, Windows™ desktop applications can be imported using the applications' installation packages. These installation packages can include an .msi file or any other type of installation package used in the industry. In some embodiments, such installation packages can be App-V™ (e.g., .sft or .appv) packages. Web applications can be imported into the application compatibility system by using one of the two different exemplary approaches described below, or a combination of those approaches. In some embodiments, web applications can be imported by a directed web spider or web crawler to crawl over the run-time HTML pages and capture them for import into the application compatibility system. In some embodiments, importing can be accomplished by importing the web applications' source files into a database of application compatibility system.

Figure 5:
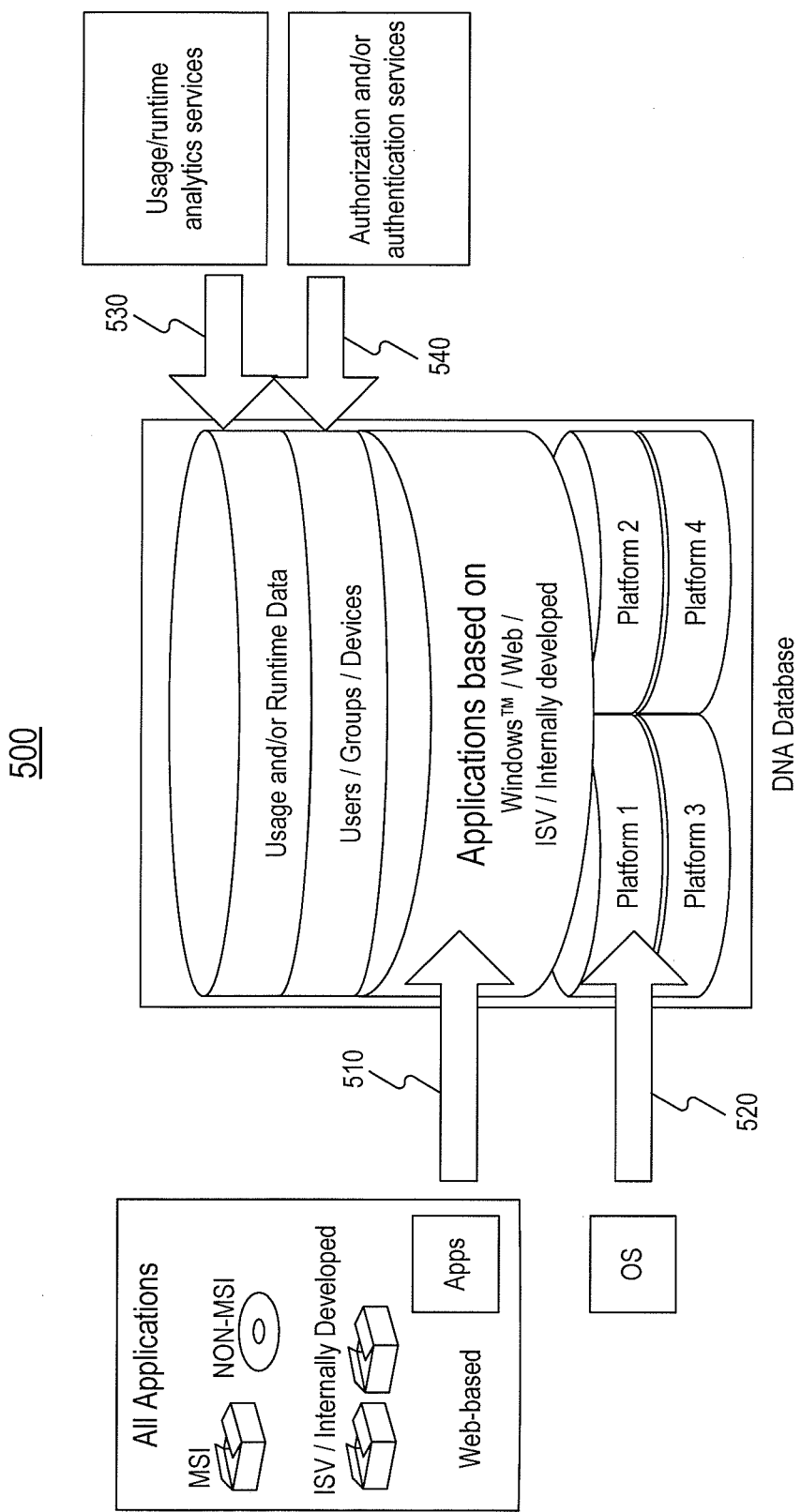
FIG. 5 is a block diagram of an exemplary database of an application compatibility system, consistent with embodiments of the present disclosure.

FIG. 5 depicts such an exemplary database, DNA database 500, of an application compatibility system. In accordance with some embodiments, DNA database 500 can be a structured collection of tables, lists, or other data for design verification setup and runtime execution. As such, the structure may be organized as a relational database or an object-oriented database. In some embodiments, DNA database 500 can be a hardware system comprising physical computer readable storage media and input and/or output devices configured to receive and provide access to tables, lists, or other data structures. Furthermore, configured as a hardware system, DNA database 500 can include one or more processors and/or displays.

In some embodiments, DNA database 500 can reside within a server (e.g., server 122) hosting the application compatibility system. In some embodiments, DNA database 500 can reside on a server (or on a distributed network of servers) remote from a server hosting the application compatibility system. Applications imported in importing step 510 of the application compatibility system can reside in DNA database 500. Each such application can be associated with one or more compatibility algorithms, which can also reside in DNA database 500. In some embodiments, compatibility algorithms are created by a user of the application compatibility system, whereas in other embodiments, such algorithms can already be created and saved in a universal algorithm library residing in DNA database 500.

DNA database 500 can also include information associated with operating systems (e.g., operating system DNA) 520, running on computing device 200. For example, operating systems running on computing device can include Windows 7™, Windows Server 2003™, Windows XP™, and Windows Server 2008 R2™. In some embodiments, information associated with operating system (e.g., operating system image or snapshot) can be uploaded by a user of the application compatibility system, whereas in other embodiments such information can be extracted by an application compatibility system itself. For example, operating system DNA can include information describing a certificate chain on an operating system image. Using the signing certificate authority on the certificate chain, an algorithm can simply process the certificate chain until it identifies the certificate as either trusted or untrusted. It will be understood that the application compatibility system can also allow users to load multiple operating system images concurrently to enable the user to execute algorithms for compatibility with all such platforms in a single pass. DNA database 500 can further include information associated with usage and/or runtime data 530. DNA database 500 can further include information associated with auditing, performance, users, groups, and/or devices 540, as depicted in FIG. 5.

Figure 6:
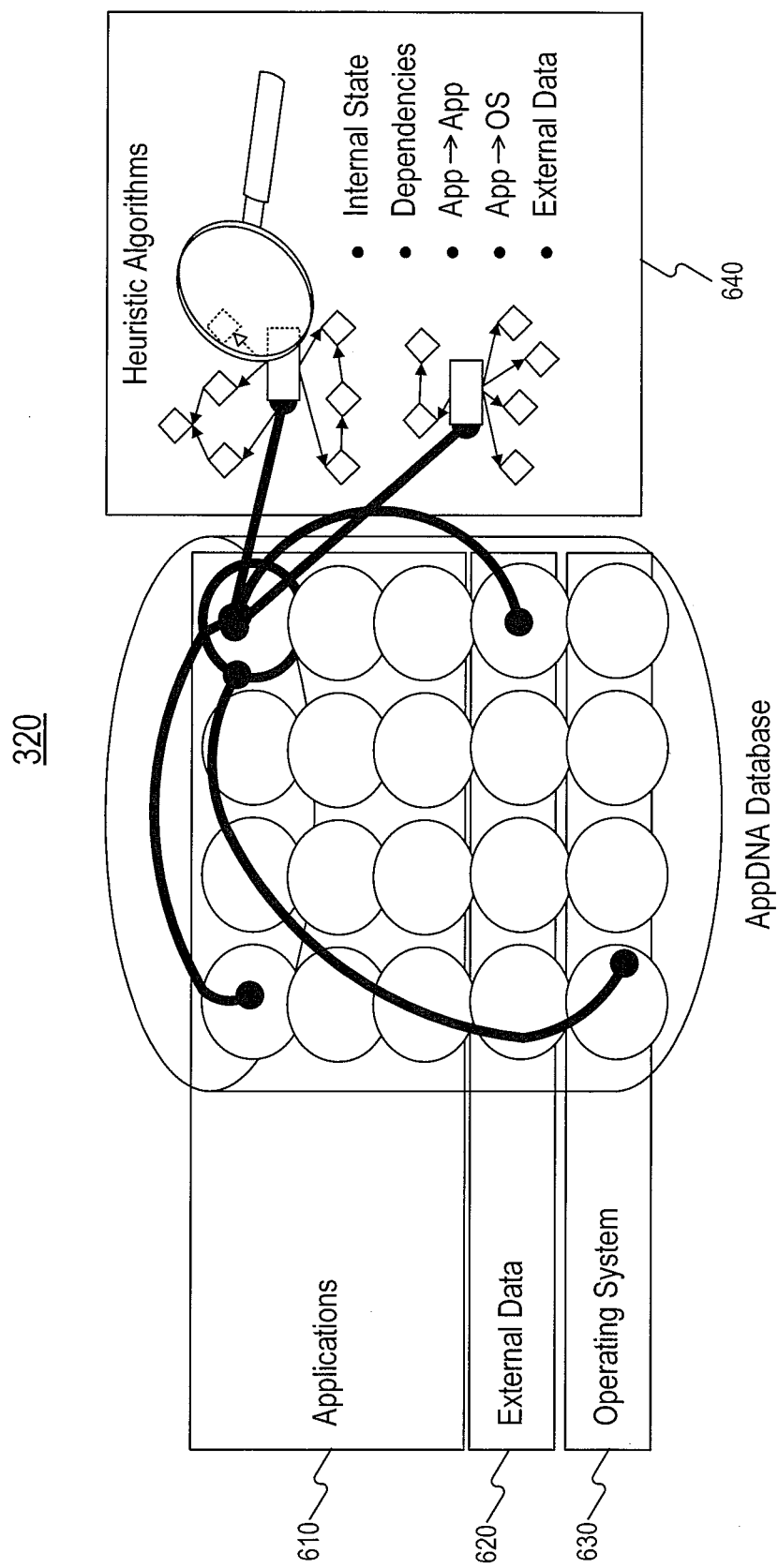
FIG. 6 is a block diagram showing an exemplary embodiment of application compatibility system performing an analysis of an application, consistent with embodiments of the present disclosure.

FIG. 6 depicts an exemplary analysis step 320 of an application compatibility system. After the applications are imported into the application compatibility system, those applications can be analyzed to check for compatibility with one or more platforms. An exemplary analysis process can include analyzing an application's DNA comprising information associated with an application's install logic, files, registry settings, configuration settings, or API calls. In some embodiments, an analysis process can also include analyzing any of an operating system image data 630, external data 620, journal entries (not shown), or configuration manager (not shown) data associated with runtime environment. A typical analysis process involves analyzing imported applications 610 just once. There may be embodiments, however, where imported applications 610 may need to be re-analyzed, for example, based on changes to any attributes of the one or more platforms including an operating system of the one or more platforms. Furthermore, if there are any changes to any of the other attributes of the one or more platforms, imported applications 610 can also be re-analyzed. In some embodiments, analysis step 320 can comprise analyzing an application's DNA comprising atomic elements and/or groups of atomic elements.

In some embodiments, a compatibility status of an application can be determined by verifying a digital signature associated with the application. A digital signature associated with an application can be a generic pattern or a specific pattern. For example, an application's digital signature can be a hash value returned by a hash function. It is well understood that a hash function can be any algorithm that maps data of variable length to data of a fixed length. The values returned by a hash function can be called hash values, hash codes, hash sums, checksums, or simply hashes. In some embodiments where an application's digital signature is defined as a predefined hash value of a specific string of data (e.g., meta data associated with the application), an application compatibility system can determine the application's compatibility with a given platform by comparing the application's hash value for the given platform with that of the pre-defined hash value. If the comparison results in a match between the application's hash value for the given platform and the pre-defined hash value, the application compatibility system can identify the application as being compatible with the given platform. If, on the other hand, the comparison does not result in a match between the application's hash value for the given platform and the pre-defined hash value, the application compatibility system can identify the application as being not compatible with the given platform. It will be understood that an application's digital signature can be defined in many ways other than and different from the exemplary hash function described above.

Imported applications can be associated with compatibility algorithms that can be used in the analysis process. In some embodiments, each imported application can be associated with one or more compatibility algorithms. Compatibility algorithms can be implemented as heuristic algorithms 640. In some embodiments, compatibility algorithms can relate to information associated with the one or more platforms including internal states, dependencies, relationship between one application to another, relationship between an application and an operating system, or external data. Compatibility algorithms can also relate to operating system image-dependent algorithms, including dependencies on features that are provided by an operating system. When relevant, these algorithms can interrogate the operating system image data that has been loaded into the database (e.g., DNA database 500) of the application compatibility system. These algorithms can check a variety of operating system image information 630, including: APIs, registry information, file management system for each fixed drive partition, the certificate store, or some compatibility settings.

The application compatibility system can generate reports (e.g., report step 330), as depicted in FIG. 7, as an output of analysis step 320. For example, such reports can contain information about a compatibility status of one or more applications that have been analyzed by the application compatibility system to determine whether the one or more applications are compatible to a corresponding platform. In some embodiments, reports can include a plurality of icons to indicate the compatibility status of an application. For example, icons represented by red (R), amber (A), and green (G) colors or indications can signify different statuses for an application. An icon G can indicate that an application will or is likely to work on a target platform; an icon A can indicate either that an application can fail or can have impaired functionality or that whether the application will work is unknown, although remediation is possible. An icon R, on the other hand, can indicate that the application is likely to or certain to fail and that the application may need redevelopment.

FIG. 7 depicts an exemplary report of an application compatibility system. FIG. 7 depicts an overview summary report of compatibility status of a plurality of applications on a plurality of platforms. For example, FIG. 7, depicts a compatibility status of Microsoft™'s ActiveSync™ application (version 3.7) 740 across a plurality of platforms including, but not limited to, Desktop Compatibility Manager Windows 7™ SP1 platform 760, SBC Manager XenApp™ Hosted TS platform 770, and App-V™ platform 780. As depicted in FIG. 7, ActiveSync™'s compatibility status is indicated with an icon R (e.g., red icon) 710 for Desktop Compatibility Manager Windows 7™ SP1 and App-V™ platforms, whereas its compatibility status is indicated with icon G (e.g., green icon) 720 for SBC Manager XenApp™ Hosted TS platform. In this example, a status icon R 710 can indicate that ActiveSync™ is likely to or certain to fail and further that ActiveSync™ may need redevelopment for the platforms Desktop Compatibility Manager Windows 7™ SP1 and App-V™. On the other hand, icon G 720 can indicate that ActiveSync™ application 740 is likely to work on App-V™ platform 780. FIG. 7 also depicts a compatibility status of Analysts_Notebook™ application 750 on SBC Manager XenApp™ Hosted TS platform 770 with a status icon A (e.g., amber icon) 730. In this example, icon A 730 can indicate that Analysts_Notebook™ application 750 may fail or have impaired functionality, although remediation is possible.

In some embodiments, a status icon can be unknown for an application for a given platform. For example, a status icon can be unknown if the application has not been analyzed for the report and accordingly not enough data is available. In some embodiments, desktop applications can have an unknown status for reports associated with web applications and web applications can have an unknown status for reports associated with desktop applications. It will be understood that any kind of status icons can be used to indicate a compatibility status of applications. It will further be understood that a definition of each status icon can be customizable and modified by a user of the application compatibility system.

The application compatibility system can provide information about any compatibility issues that have been detected in applications. For example, for applications that are associated with an amber icon (application may fail or have impaired functionality), remediation may be possible. In the application compatibility system, the term remediation can mean the process of resolving compatibility issues by making changes to applications or the environment so that those applications can work on the target platform. The application compatibility system can provide remediation report views, which provide information about the steps that can be taken to fix compatibility issues that have been detected, where possible. In some embodiments, more than one alternative approach can be provided. The remediation report can also provide details of the application components that are affected by each compatibility issue.

Figure 8:
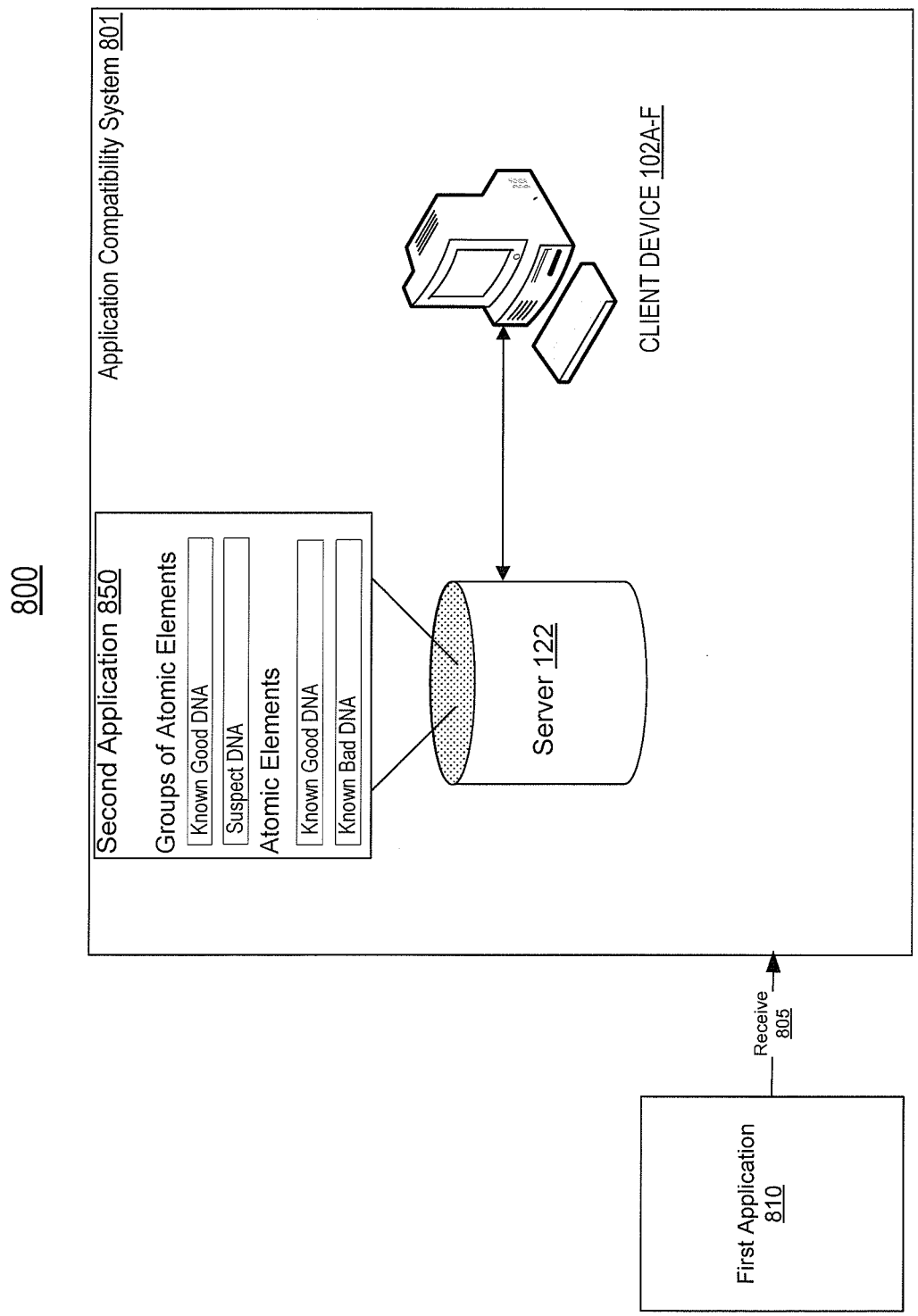
FIG. 8 is a block diagram showing an exemplary embodiment of application compatibility system receiving a compatibility status request of an application for a given platform, consistent with embodiments of the present disclosure.
Figure 9:
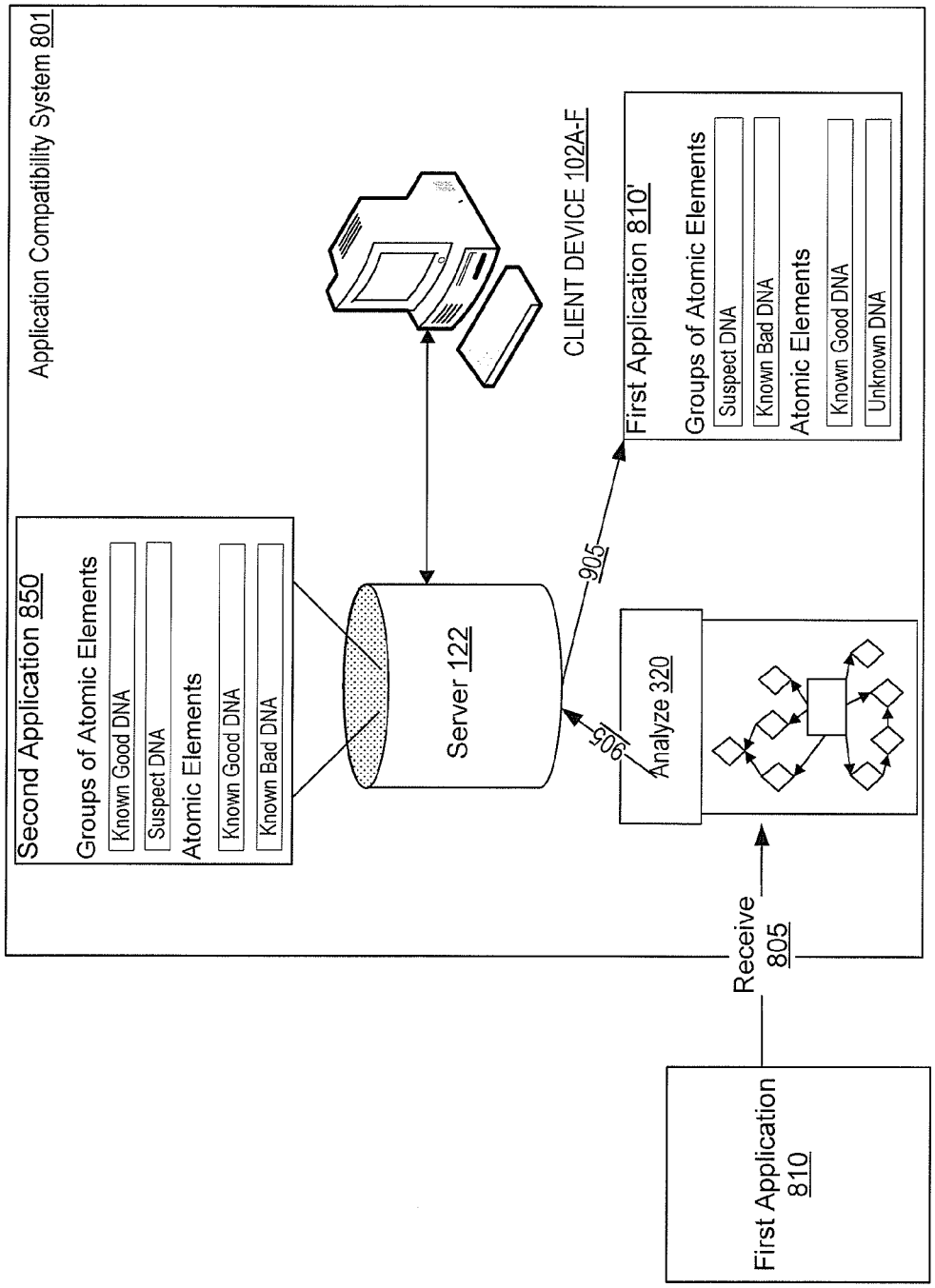
FIG. 9 is a block diagram showing an exemplary embodiment of application compatibility system organizing data points associated with an application, consistent with embodiments of the present disclosure.
Figure 10:
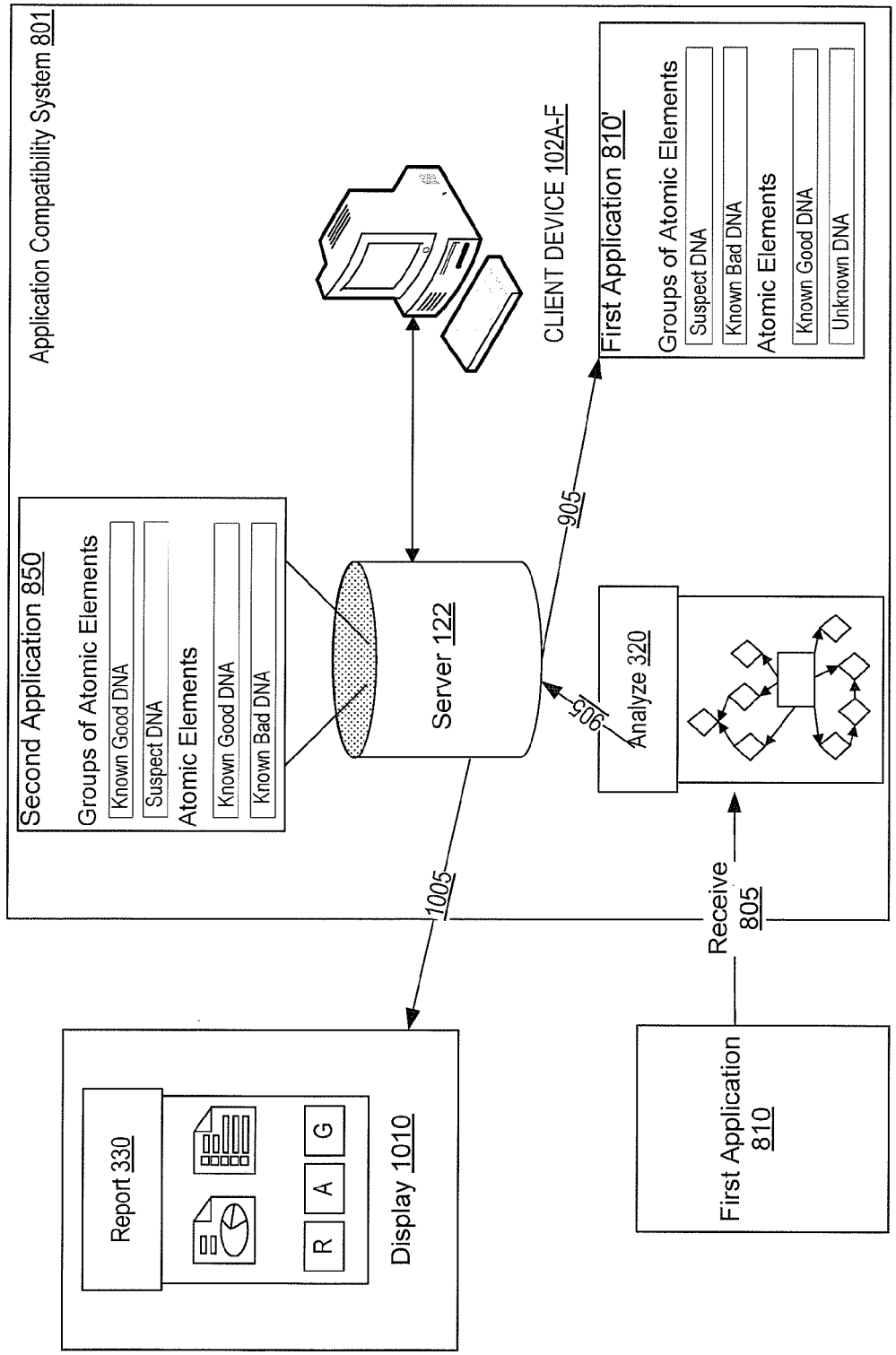
FIG. 10 is a block diagram showing an exemplary embodiment of application compatibility system displaying compatibility status of an application for a given platform, consistent with embodiments of the present disclosure.
Figure 11:
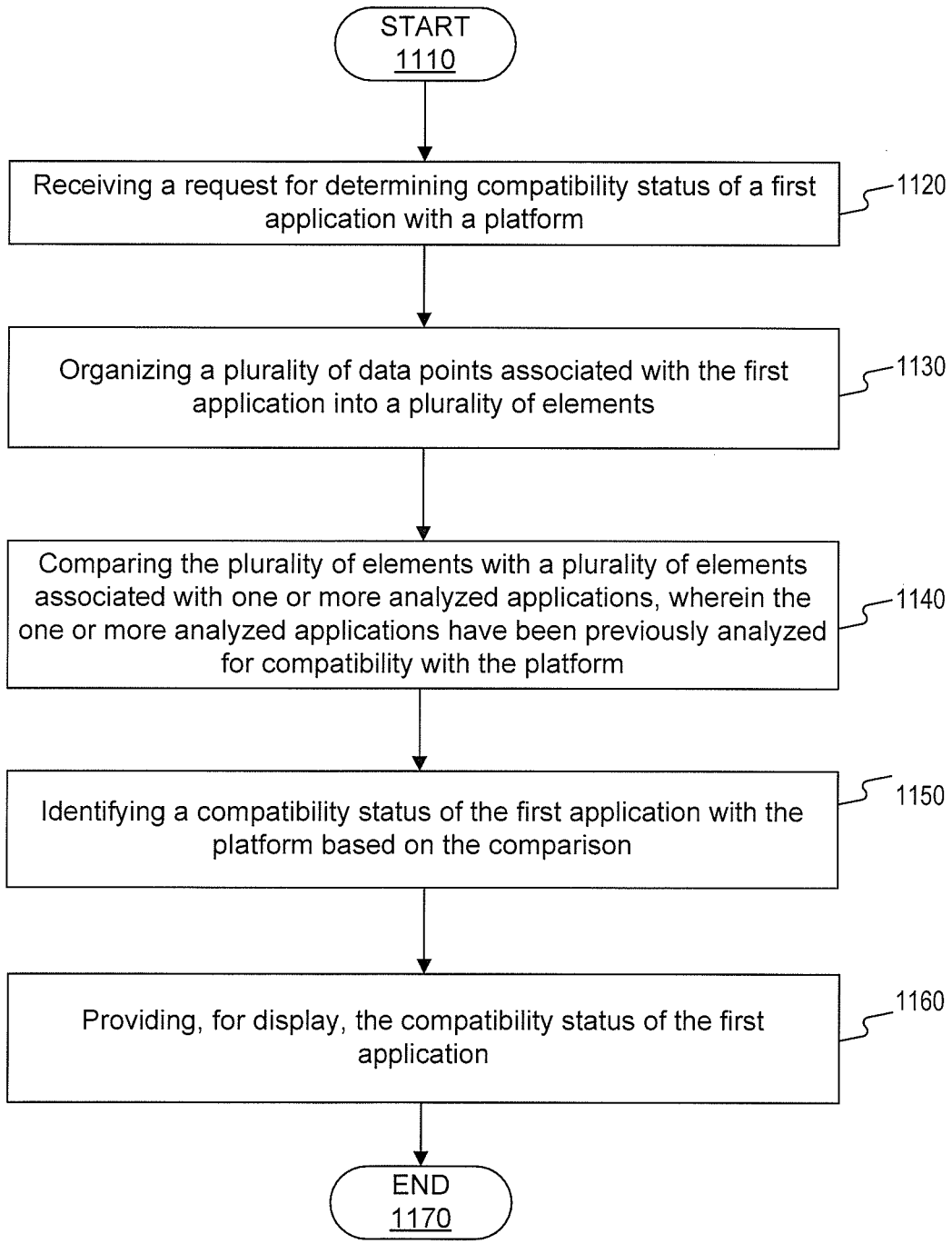
FIG. 11 is a flowchart illustrating an exemplary method for discovering application compatibility status for a given platform, consistent with embodiments of the present disclosure.

FIGS. 8-10 depict block diagrams illustrating how applications compatibility system 801 performs compatibility of an application status for a given platform, consistent with embodiments of the present disclosure. These steps are also illustrated as a flow chart in FIG. 11, which illustrates an exemplary method for discovering application compatibility status for a given platform, consistent with embodiments of the present disclosure. Referring to FIG. 11, it will be appreciated that the illustrated procedure can be altered to change the order of the steps, delete steps, or further include additional steps.

FIG. 8 depicts an applications compatibility system receiving, at step 805 a request for determining compatibility status of a first application with a given platform. An exemplary receiving step is shown in a receiving block 1120 of FIG. 11). In some embodiments, request step 805 can be received at application compatibility system 801. Application compatibility system 801 can be similar to an application compatibility system described in FIG. 3. For simplicity, a block diagram of application compatibility system 801 is depicted with only server 122 that can host an application compatibility system and client device 102A-F. Step 805 can be associated with first application 810. First Application 810 can either be an MSI application, a non-MSI application, or a web application. In some embodiments, first application 810 can be a new application. In some embodiments, first application 810 can be an existing application that is currently residing at application compatibility system 801. In some embodiments, first application 810 can be a newer version of an existing application that is currently residing at application compatibility system 801.

Server 122 can host a database (e.g., DNA database 500), where a plurality of applications can reside. In some embodiments, the plurality of applications residing at server 122 can be organized into atomic elements of the applications. For example, atomic elements of an application can comprise at least one of the following: API calls between an operating system to the application; files that are either installed, created, or modified by the application; or folders that are either installed, created, or modified by the application. Atomic elements can also comprise at least one of the following: registry keys that are either installed, created, or modified by the application; registry values that are either installed, created, or modified by the application; API calls between the application and another application; meta data information associated with the files of the application; or information associated with a system for adding new atomic elements.

In some embodiments, the plurality of applications residing at server 122 can also be organized into groups of atomic elements. For example, a group of atomic elements can comprise API calls associated with a plurality of files. Such an exemplary group of atomic elements can comprise a combination of API calls between a first file and a second file of the plurality of files, and API calls between one files of the plurality of files and an operating system. In some embodiments, groups of atomic elements can comprise information associated with a system for adding new atomic elements; or files types associated with one or more files; or meta data associated with one or more files. It will be understood that the above-listed group of atomic elements are merely exemplary and application's DNA can be organized into any number of groups of atomic elements. In some embodiments, the plurality of applications residing at server 122 can also be organized into atomic elements and groups of atomic elements.

In some embodiments, the plurality of applications residing at server 122 can also be organized into a plurality of containers and/or a plurality of sub-containers. In some embodiments, a container can be a group of atomic elements and can be defined to comprise a collection of files residing in a folder, and a sub-container could be a sub-folder residing in the folder. In some embodiments, a container and/or a sub-container can comprise API calls associated with a plurality of files. Such an exemplary container and/or an exemplary sub-container can comprise a combination of API calls between a first file and a second file of the plurality of files, and API calls between one files of the plurality of files and an operating system. In some embodiments, an exemplary container and/or or an exemplary sub-container can comprise information associated with a system for adding new atomic elements; or files types associated with one or more files; or meta data associated with one or more files. It will be understood that the above-listed containers and/or sub-containers are merely exemplary and atomic elements can be organized into any number of containers and/or sub-containers.

FIG. 8 illustrates an exemplary second application 850 residing within server 122. In some embodiments, second application 850 can be organized into atomic elements and/or groups of atomic elements. In some embodiments, second application 850 can be organized into containers and/or sub-containers. In some embodiments, second application 850 could have already been processed by application compatibility system 801 that can result in an organization including atomic elements and/or groups of atomic elements. In some embodiments, second application 850 could have already been processed by application compatibility system 801 that can result in an organization including containers and/or containers. In some embodiments, second application 850 could have been processed by a system external to and remote from application compatibility system 801 that can result in an organization including atomic elements and/or groups of atomic elements. In some embodiments, second application 850 can comprise a plurality of applications that need to be tested for compatibility with one or more platforms.

In some embodiments, a compatibility status of second application 850 can already be identified with at least one status icon such as "works" or "doesn't work". A works icon can indicate that second application 850 is likely to be compatible with a target platform. In some embodiments, a works icon can indicate that all atomic elements associated with second application 850 can be marked as known to be compatible with the target platform. This status can be referred to as "Known Good DNA." In some embodiments, a works icon can indicate that all groups of atomic elements associated with second application 850 can be marked as known to be compatible with the target platform, which can be referred to as Known Good DNA. In some embodiments, Known Good DNA can be defined as a status that signifies that all atomic elements and/or all groups of atomic elements are more likely or always compatible with the target platform. In some embodiments, a works icon can indicate that all containers and/or all sub-containers associated with second application 850 can be marked as known to be compatible with the target platform, which can be referred to as Known Good DNA. In some embodiments, Known Good DNA can be defined as a status that signifies that all containers and/or all sub-containers are more likely or always compatible with the target platform. It will be understood that other definitions of Known Good DNA are possible.

A doesn't work icon can indicate that second application 850 is likely to or certain to fail compatibility and that second application 850 may further need redevelopment to be compatible with the target platform. In some embodiments, a doesn't work icon can indicate that all atomic elements associated with second application 850 can be marked as possible suspects to cause compatibility failure of second application 850. This status can be referred to as "Suspect DNA." In some embodiments, a doesn't work icon can indicate that all groups of atomic elements associated with second application 850 can be marked as possible suspects to cause compatibility failure of second application 850, which can be referred to as Suspect DNA. In some embodiments, a doesn't work icon can indicate that all containers and/or all sub-containers associated with second application 850 can be marked as possible suspects to cause compatibility failure of second application 850, which can be referred to as Suspect DNA.

As more applications (e.g., second application 850) are analyzed and their compatibility statuses are identified, a repository of Known Good DNA expands. In some embodiments, application status for all applications (e.g., second application 850) can be stored in a memory of server 122 that can host application compatibility system 801. In some embodiments, application status for all applications (e.g., second application 850) can be stored in a memory external to or remote of server 122. As more and more applications (e.g., second application 850) are tested for compatibility with a platform, an increasing number of atomic elements can be marked as Known Good DNA. In some embodiments, as more and more applications (e.g., second application 850) are tested for compatibility with a platform, an increasing number of containers and/or sub-containers can be marked as Known Good DNA.

In some embodiments, a database (e.g., DNA database 500 hosted by server 122) can be prepopulated with previously 'learned' status of atomic elements associated with one or more applications (e.g., second application 850). For example, a 'learned' status of atomic elements can be known when applications comprising such atomic elements are verified for compatibility with a particular platform and a status is identified for such atomic elements. Such 'learned' status of atomic elements can include, for example, Known Good DNA, Suspect DNA, and Known Bad DNA. In some embodiments, the database might not be prepopulated with previously 'learned' status of atomic elements associated with one or more applications.

In some embodiments, a database (e.g., DNA database 500 hosted by server 122) can be prepopulated with previously 'learned' status of containers and/or sub-containers associated with one or more applications (e.g., second application 850). For example, a 'learned' status of containers and/or sub-containers can be known when applications comprising such containers and/or sub-containers are verified for compatibility with a particular platform and a status is identified for such containers and/or sub-containers. Such 'learned' status of containers and/or sub-containers can include, for example, Known Good DNA, Suspect DNA, and Known Bad DNA. In some embodiments, the database might not be prepopulated with previously 'learned' status of containers and/or sub-containers associated with one or more applications.

In some embodiments, when an application (e.g., second application 850) is tested for compatibility with a platform and a status is identified for the application and its atomic elements, previously identified Suspect DNA status can be changed to Known Good DNA. For example, an atomic element comprising API calls associated with Microsoft™ Word 2007™ application and an operating system can initially be identified with a Suspect DNA, if the Word 2007™ application is identified with doesn't work status for a given platform. Later, if the compatibility of Microsoft™ Word 2010™ application is tested for the same platform as that of Word 2007™, and if Word 2010™ application is identified with a works status, then all atomic elements associated with Word 2010™ application can be identified with a Known Good DNA status. In the above-example, if the Word 2010™ application comprises the same atomic element associated with API calls as that of as the Word 2007™ application, then the API calls atomic element that was previously identified with Suspect DNA can now be identified with a modified status of Known Good DNA for the Word 2007™ application.

In some embodiments, when an application (e.g., second application 850) is tested for compatibility with a platform and a status is identified for the application and its containers and/or sub-containers, previously identified Suspect DNA status can be changed to Known Good DNA. For example, a container and/or sub-container comprising API calls associated with Microsoft™ Word 2007™ application and an operating system can initially be identified with a Suspect DNA, if the Word 2007™ application is identified with doesn't work status for a given platform. Later, if the compatibility of Microsoft™ Word 2010™ application is tested for the same platform as that of Word 2007™, and if Word 2010™ application is identified with a works status, then all containers and/or all sub-containers associated with Word 2010™ application can be identified with a Known Good DNA status. In the above-example, if the Word 2010™ application comprises the same container and/or the sub-container associated with API calls as that of as the Word 2007™ application, then the API calls container and/or sub-container that was previously identified with Suspect DNA can now be identified with a modified status of Known Good DNA for the Word 2007™ application.

With the testing of more and more applications (e.g., second application 850), the category of atomic elements identified as Suspect DNA associated with an application can shrink as more and more elements of the category of atomic elements identified as Suspect DNA may be converted to Known Good DNA. In some embodiments, the category of atomic elements identified as Suspect DNA associated with an application (e.g., second application 850) can shrink to a handful of Suspect DNA elements. In some embodiments, the handful of Suspect DNA elements can be handed over to an individual (e.g., a specialist who specializes in application compatibility) who can analyze the Suspect DNA elements and determine whether the Suspect DNA is in fact good DNA and change the status accordingly. In some embodiments, the individual can also analyze the Suspect DNA elements and identify the reasons that can cause the application to not be compatible for a platform. In some embodiments, the individual analyzing Suspect DNA elements can identify atomic elements that can cause the application to not be compatible for a platform. The identified atomic elements, for example, can be referred to as "Known Bad DNA." In some embodiments, Known Bad DNA can be defined such that an application (e.g., second application 850) that contains at least one Known Bad DNA element can fail compatibility for the given platform. It will be understood that other definitions of Known Bad DNA are possible.

With the testing of more and more applications (e.g., second application 850), the category of containers and/or sub-containers identified as Suspect DNA associated with an application can shrink as more and more containers and/or sub-containers of the category of containers and/or sub-containers identified as Suspect DNA may be converted to Known Good DNA. In some embodiments, the category of containers and/or sub-containers identified as Suspect DNA associated with an application (e.g., second application 850) can shrink to a handful of Suspect DNA containers and/or sub-containers. In some embodiments, the handful of Suspect DNA containers and/or sub-containers can be handed over to an individual (e.g., a specialist who specializes in application compatibility) who can analyze the Suspect DNA containers and/or sub-containers and determine whether the Suspect DNA is in fact good DNA and change the status accordingly. In some embodiments, the individual can also analyze the Suspect DNA containers and/or sub-containers and identify the reasons that can cause the application to not be compatible for a platform. In some embodiments, the individual analyzing Suspect DNA containers and/or sub-containers can identify containers and/or sub-containers that can cause the application to not be compatible for a platform. The identified containers and/or sub-containers, for example, can be referred to as "Known Bad DNA." In some embodiments, Known Bad DNA can be defined such that an application (e.g., second application 850) that contains at least one Known Bad DNA container and/or sub-container can fail compatibility for the given platform. It will be understood that other definitions of Known Bad DNA are possible.

After most, if not all, Suspect DNA elements are analyzed, applications (e.g., second application 850) can then be automatically marked with a status icon signifying a compatibility status. In some embodiments, applications can be automatically marked with status icons as follows: works or green icon that can signify that an application comprises only Known Good DNA elements; doesn't work or red icon that can signify that an application comprises at least one Known Bad DNA element; or "unknown" or amber icon that can signify that an application comprises either Known Good DNA elements or Suspect DNA elements but not Known Bad DNA elements. It will be understood that, in some embodiments, other definitions of "works," "doesn't work," and "unknown" status can be used.

After most, if not all, Suspect DNA containers and/or sub-containers are analyzed, applications (e.g., second application 850) can then be automatically marked with a status icon signifying a compatibility status. In some embodiments, applications can be automatically marked with status icons as follows: works or green icon that can signify that an application comprises only Known Good DNA containers and/or sub-containers; doesn't work or red icon that can signify that an application comprises at least one Known Bad DNA container and/or sub-container; or "unknown" or amber icon that can signify that an application comprises either Known Good DNA containers and/or sub-containers, or Suspect DNA containers and/or sub-containers, but not Known Bad DNA containers and/or sub-containers. It will be understood that, in some embodiments, other definitions of "works," "doesn't work," and "unknown" status can be used.

In instances where there can be conflicts between Known Good DNA, Known Bad DNA, and Suspect DNA, the application compatibility system can define a precedence order to resolve such conflicts. For example, a precedence order can be defined such that Known Good DNA can take precedence over Suspect DNA, whereas Known Bad DNA can take precedence over any other status including Known Good DNA and Suspect DNA. In some embodiments, a date related precedence can be defined. For example, a precedence order can be defined such that a latest status takes precedence over previous statuses irrespective of whether the latest status is either Known Good DNA or Known Bad DNA. It will be understood that, in some embodiments, other precedence order definitions are possible.

In some embodiments, when an analyzed application comprises a combination of Known Good DNA, Known Bad DNA, and Suspect DNA, heuristics can be employed to help in determining the relative importance that can be associated with each of Known Good DNA, Known Bad DNA, and Suspect DNA. For example, a different weightage factor can be associated for each of the different DNA elements that can help in determining which elements (or containers/sub-containers) takes precedence over the other. In some embodiments, such determination can be implemented by first detecting dependency trees based off of an executable of an application either by a shortcut or by a trait of being the only executable in the application. After detecting dependency trees, application compatibility system 801 can analyze each of the dependencies, for example, by matching API export and import calls across different assemblies of the application. After such analysis, if it is determined that the Known Good DNA is comprised within the primary dependency tree, while the Suspect DNA is not comprised within the primary dependency tree, application compatibility system 801 can determine that Known Good DNA status has precedence over other statuses. It will be understood that, in some embodiments, other ways of determining the relative importance between the different statuses can be possible.

Next, FIG. 9 depicts an application compatibility system organizing, at step 905, first application 810's DNA into atomic elements and/or groups of atomic elements. An exemplary organizing step is shown in an organizing block 1130 of FIG. 11. The process of organizing first application 810's DNA into atomic elements and/or groups of atomic elements can be the same as that of organizing second application 850's DNA into atomic elements and/or groups of atomic elements, as described in FIG. 8's step 805 (and FIG. 11's step 1120) above. Organizing step 905 can be depicted, for example, using the same element 320 as depicted in FIG. 6. In some embodiments, first application 810 can already be organized into atomic elements and/or groups of atomic elements before request 805 is received.

In some embodiments, at step 905, application compatibility system organizes first application 810's DNA into containers and/or sub-containers. The process of organizing first application 810's DNA into containers and/or sub-containers can be the same as that of organizing second application 850's DNA into containers and/or sub-containers, as described in FIG. 8's step 805 (and FIG. 11's step 1120) above. In some embodiments, first application 810 can already be organized into containers and/or sub-containers before request 805 is received.

Next, FIG. 9 depicts a step (step 1140 of FIG. 11) of comparing atomic elements of first application 810 with that of atomic elements of second application 850. In some embodiments, comparing step 1140 can be used to identify a compatibility status of first application 810 based on a compatibility status of second application 850 as long as there is at least one atomic element or at least one group of atomic elements in common between first application 810 and second application 850. In some embodiments, when comparing step 1140 is being performed, a compatibility status of second application 850 is already known, identified, and stored in application compatibility system 801. For example, second application 850 can be identified with at least one of the following status icons: works or a green icon that can signify that second application 850 comprises only Known Good DNA elements for one or more particular platforms; doesn't work or red icon that can signify that second application 850 comprises at least one Known Bad DNA element for one or more particular platforms; or "unknown" or amber icon that can signify that second application 850 can only comprise some combination of either Known Good DNA elements or Suspect DNA elements but cannot comprise Known Bad DNA elements.

In some embodiments, comparing step 1140 compares containers and/or sub-containers of first application 810 with that of containers and/or sub-containers of second application 850. In some embodiments, comparing step 1140 can be used to identify a compatibility status of first application 810 based on a compatibility status of second application 850 as long as there is at least one container and/or one sub-container in common between first application 810 and second application 850. In some embodiments, when comparing step 1140 is being performed, a compatibility status of second application 850 is already known, identified, and stored in application compatibility system 801. For example, second application 850 can be identified with at least one of the following status icons: works or a green icon that can signify that second application 850 comprises only Known Good DNA containers and/or sub-containers for one or more particular platforms; doesn't work or red icon that can signify that second application 850 comprises at least one Known Bad DNA container and/or sub-container for one or more particular platforms; or "unknown" or amber icon that can signify that second application 850 can only comprise some combination of either Known Good DNA containers and/or sub-containers, or Suspect DNA containers and/or sub-containers, but cannot comprise Known Bad DNA containers and/or sub-containers.

Next, in step 1150, an identifying step is described that can comprise identifying a status for first application 810 based on the comparison between atomic elements of first application 810 with that of atomic elements of second application 850, as described in step 1140. For example, identifying a compatibility status of first application 810 can be based on an identification status of one or more atomic elements or one or more groups of atomic elements of second application 850, as long as there is at least one atomic element or at least one group of atomic elements common between first application 810 and second application 850. While this example refers to atomic elements of second application 850, it is appreciated that the atomic elements that are used for comparing with the first application's atomic elements can be from multiple applications, regardless of whether those multiple applications are related or not to the first application. For example, unrelated applications can use substantially similar or identical modules for making an API call; thus, in similar situations, the atomic elements of an application would correspond with the atomic elements of the unrelated application.

In some embodiments, identifying step 1150 can comprise identifying a status for first application 810 based on the comparison between containers and/or sub-containers of first application 810 with that of containers and/or sub-containers of second application 850, as described in step 1140. For example, identifying a compatibility status of first application 810 can be based on an identification status of one or more containers and/or one or more sub-containers of second application 850, as long as there is at least one container and/or sub-container common between first application 810 and second application 850. While this example refers to containers and/or sub-containers of second application 850, it is appreciated that the containers and/or sub-containers that are used for comparing with the first application's containers and/or sub-containers can be from multiple applications, regardless of whether those multiple applications are related or not to the first application. For example, unrelated applications can use substantially similar or identical modules for making an API call; thus, in similar situations, the containers and/or sub-containers of an application would correspond with the containers and/or sub-containers of the unrelated application.

In some embodiments, identifying step 1150 can comprise a determination whether at least one atomic element of first application 810 is also an atomic element of second application 850. In some embodiments, identifying step 1150 can comprise a determination whether at least one group of atomic elements of first application 810 is also a group of atomic elements of second application 850. If a determination that at least one atomic element or at least one group of atomic elements of first application 810 is also an atomic element or a group of atomic elements of second application 850 (or another application), then the at least one atomic element or the at least one group of atomic elements of first application 810 is automatically marked with the same compatibility status as that of the corresponding atomic element or a group of atomic elements of second application 850.

For example, an atomic element comprising API calls associated with Microsoft™ Word 2007™ application (exemplary second application 850) and an operating system can initially be identified with a Suspect DNA, for a given platform. Next, if the compatibility of Microsoft™ PowerPoint 2007™ application is tested for the same platform as that of Word 2007™, and if PowerPoint 2007™ comprises the same atomic element as that of Word 2007™, namely, API calls associated with the operating system, then that atomic element of PowerPoint 2007™ application is also identified with the same Suspect DNA status automatically.

In some embodiments, identifying step 1150 can comprise a determination whether at least one container and/or sub-container of first application 810 is also a container and/or sub-container of second application 850. If a determination that at least one container and/or sub-container of first application 810 is also a container and/or sub-container of second application 850 (or another application), then the at least one container and/or sub-container of first application 810 is automatically marked with the same compatibility status as that of the corresponding container and/or sub-container of second application 850. For example, a container and/or sub-container comprising API calls associated with Microsoft™ Word 2007™ application (exemplary second application 850) and an operating system can initially be identified with a Suspect DNA, for a given platform. Next, if the compatibility of Microsoft™ PowerPoint 2007™ application is tested for the same platform as that of Word 2007™, and if PowerPoint 2007™ comprises the same container and/or sub-container as that of Word 2007™, namely, API calls associated with the operating system, then that container and/or sub-container of PowerPoint 2007™ application is also identified with the same Suspect DNA status automatically.

In some embodiments, the automatic marking of atomic elements of first application 810 with the same compatibility status as that of the corresponding atomic elements or a group of atomic elements of second application 850 can be performed by server 122 hosting application compatibility system 801. In some embodiments, the automatic marking of containers and/or sub-containers of first application 810 with the same compatibility status as that of the corresponding containers and/or sub-containers of second application 850 can be performed by server 122 hosting application compatibility system 801. In some embodiments such automatic marking can be performed by a client device (e.g., client device 102A-F). In some embodiments, such marking can be performed manually by a user of application compatibility system 801.

In some embodiments, identifying step 1150 can include each atomic element of first application 810 that can be compared with an existing repository of atomic elements with identified statuses and associated with existing applications (e.g., second application 850). Accordingly, each atomic element of first application 810 can be marked with at least one status icon such as Known Good DNA, Known Bad DNA, or Suspect DNA. In some embodiments, when most, if not all, atomic elements of first application 810 are marked with a compatibility status icon, a compatibility status of first application 810 as a whole can be identified. In some embodiments, a compatibility status of first application 810 can be identified by server 122 hosting application compatibility system 801. In some embodiments, a compatibility status of first application 810 can be identified by client device 102A-F.

In some embodiments, identifying step 1150 can include each container and/or sub-container of first application 810 that can be compared with an existing repository of containers and/or sub-containers with identified statuses and associated with existing applications (e.g., second application 850). Accordingly, each container and/or sub-container of first application 810 can be marked with at least one status icon such as Known Good DNA, Known Bad DNA, or Suspect DNA. In some embodiments, when most, if not all, containers and/or sub-containers of first application 810 are marked with a compatibility status icon, a compatibility status of first application 810 as a whole can be identified.

Next, FIG. 10 depicts an application compatibility system displaying, at step 1005, (step 1160 of FIG. 11) a compatibility status for first application 810 with a platform. An exemplary organizing step is shown in an organizing block 1160 of FIG. 11. In some embodiments, the compatibility status can be displayed on a graphical user interface (e.g., display 1010). For example, the compatibility status can be indicated as an element, report 330, similar to the exemplary report depicted in FIG. 7. In some embodiments, the displayed compatibility status can include displaying at least one status icon for first application 810. For example, a displayed status icon can include one of the following icons: red, amber, and green, which can represent different statuses for first application 810. In some embodiments, a green icon can indicate that first application 810 is likely to be compatible with the platform, an amber icon can indicate that first application 810 can fail or can have impaired functionality, although remediation is possible. In some embodiments, a red icon can indicate that first application 810 is likely to or certain to fail and that first application 810 may need redevelopment to be compatible with the platform. In some embodiments, a compatibility status of first application 810 on a graphical user interface can be displayed on at least one client device 102A-F. In some embodiments, a compatibility status of first application 810 on a graphical user interface can be displayed on a display associated with server 122 hosting application compatibility system 801.

The methods disclosed herein may be implemented as a computer program product, i.e., a computer program tangibly embodied in an information carrier, e.g., in a non-transitory machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as one or more modules, one or more components, one or more subroutines, or one or more other units suitable for use in a computing environment. A computer program can be deployed to be executed on one computer or on multiple computers at one site or distributed across multiple sites and interconnected by a communication network.

In the preceding specification, the subject matter has been described with reference to specific exemplary embodiments. It will, however, be evident that various modifications and changes may be made without departing from the broader spirit and scope of the subject matter as set forth in the claims that follow. The specification and drawings are accordingly to be regarded as illustrative rather than restrictive. Other embodiments may be apparent to those skilled in the art from consideration of the specification and practice of the embodiments disclosed herein.

What is claimed is:

1. A system for discovering application compatibility status, the system comprising:
    a database configured to comprise information associated with one or more analyzed applications; and
    a server having one or more processors configured to:
        receive a request for determining compatibility of a first application with a platform;
        organize a plurality of data points associated with the first application into a plurality of elements;
        compare the plurality of elements with a plurality of elements associated with the one or more analyzed applications, wherein the one or more analyzed applications have been previously analyzed for compatibility with the platform;
        identify a compatibility status of the first application with the platform based on the comparison; and
        provide, for display, the compatibility status of the first application.

2. The system of claim 1, wherein the first application is either a new application or a newer version of an existing application of the one or more analyzed applications.

3. The system of claim 1, wherein the plurality of elements is associated with at least one of the following:
    application programming interface calls between an operating system and the first application; and
    application programming interface calls between the first application and a second application of the one or more analyzed applications.

4. The system of claim 1, wherein the plurality of elements is at least associated with static data of the first application regarding at least one of the following:
    files that are installed, created, and/or modified by the first application;
    folders that are installed, created, and/or modified by the first application;
    registry keys that are installed, created, and/or modified by the first application;
    registry values that are installed, created, and/or modified by the first application; and
    meta data associated with the first application.

5. The system of claim 1, wherein the plurality of elements is at least associated with information regarding an addition of elements that are different from the plurality of elements.

6. The system of claim 1, wherein the one or more processors identify a compatibility status of the first application that comprises at least one of the following status icons:
    green, amber, or red; and
    works, doesn't work, or unknown.

7. The system of claim 1, wherein one or more of the plurality of elements is further organized into one or more containers, each one of the one or more containers includes a collection of files residing in a folder.

8. The system of claim 7, wherein each one of the one or more containers comprises one or more sub-containers that includes a collection of files residing in a sub-folder within the folder.

9. The system of claim 7, wherein the server is configured to compare the plurality of elements by comparing one or more containers with one or more containers associated with the one or more analyzed applications.

10. The system of claim 7, wherein each one of the one or more containers is associated with at least one of the following:
    application programming interface calls between an operating system and the first application; and
    application programming interface calls between the first application and a second application of the one or more analyzed applications.

11. A method for discovering application compatibility status, the method being performed by one or more processors, the method comprising:
    receiving a request for determining compatibility of a first application with a platform;
    organizing a plurality of data points associated with the first application into a plurality of elements;
    comparing the plurality of elements with a plurality of elements associated with one or more analyzed applications, wherein the one or more analyzed applications have been previously analyzed for compatibility with the platform;
    identifying a compatibility status of the first application with the platform based on the comparison; and providing, for display, the compatibility status of the first application.

12. The method of claim 11, wherein the first application is either a new application or a newer version of an existing application of the one or more analyzed applications.

13. The method of claim 11, wherein the plurality of elements is associated with at least one of the following:
   application programming interface calls between an operating system and the first application; and
   application programming interface calls between the first application and a second application of the one or more analyzed applications.

14. The method of claim 11, wherein the plurality of elements is at least associated with static data of the first application regarding at least one of the following:
   files that are installed, created, and/or modified by the first application;
   folders that are installed, created, and/or modified by the first application;
   registry keys that are installed, created, and/or modified by the first application;
   registry values that are installed, created, and/or modified by the first application; and
   meta data associated with the first application.

15. The method of claim 11, wherein the plurality of elements is at least associated with information regarding an addition of elements that are different from the plurality of elements.

16. The method of claim 11, wherein identifying a compatibility status of the first application comprises at least one of the following status icons:
   green, amber, or red; and
   works, doesn't work, or unknown.

17. The method of claim 11, wherein one or more of the plurality of elements is further organized into one or more containers, each one of the one or more containers includes a collection of files residing in a folder.

18. The method of claim 17, wherein each one of the one or more containers comprises one or more sub-containers that includes a collection of files residing in a sub-folder within the folder.

19. The method of claim 17, wherein comparing the plurality of elements with a plurality of elements associated with one or more analyzed applications further comprises comparing the one or more containers having the plurality of elements with one or more containers associated with the one or more analyzed applications.

20. The method of claim 17, wherein each one of the one or more containers is associated with at least one of the following:
   application programming interface calls between an operating system and the first application; and
   application programming interface calls between the first application and a second application of the one or more analyzed applications.

21. A non-transitory computer-readable medium storing a set of instructions that are executable by one or more processors of one or more servers to cause the one or more servers to perform a method for discovering application compatibility status, the method comprising:
   receiving a request for determining ompatibility of a first application with a platform;
   organizing a plurality of data points associated with the first application into a plurality of elements;
   comparing the plurality of elements with a plurality of elements associated with one or more analyzed applications, wherein the one or more analyzed applications have been previously analyzed for compatibility with the platform;
   identifying a compatibility status of the first application with the platform based on the comparison; and
   providing, for display, the compatibility status of the first application.

22. The computer-readable medium of claim 21, wherein the first application is either a new application or a newer version of an existing application of the one or more analyzed applications.

23. The computer-readable medium of claim 21, wherein the plurality of elements is associated with at least one of the following:
   application programming interface calls between an operating system and the first application; and
   application programming interface calls between the first application and a second application of the one or more analyzed applications.

24. The computer-readable medium of claim 21, wherein the plurality of elements is at least associated with static data of the first application regarding at least one of the following:
   files that are installed, created, and/or modified by the first application;
   folders that are installed, created, and/or modified by the first application;
   registry keys that are installed, created, and/or modified by the first application;
   registry values that are installed, created, and/or modified by the first application; and
   meta data associated with the first application.

25. The computer-readable medium of claim 21, wherein the plurality of elements is at least associated with information regarding an addition of elements that are different from the plurality of elements.

26. The computer-readable medium of claim 21, wherein identifying a compatibility status of the first application comprises at least one of the following status icons:
   green, amber, or red; and
   works, doesn't work, or unknown.

27. The computer-readable medium of claim 21, wherein one or more of the plurality of elements is further organized into one or more containers, each one of the one or more containers includes a collection of files residing in a folder.

28. The computer-readable medium of claim 27, wherein each one of the one or more containers comprises one or more sub-containers that includes a collection of files residing in a sub-folder within the folder.

29. The computer-readable medium of claim 27, wherein comparing the plurality of elements with a plurality of elements associated with one or more analyzed applications further comprises comparing the one or more containers having the plurality of elements with one or more containers associated with the one or more analyzed applications.

30. The computer-readable medium of claim 27, wherein each one of the one or more containers is associated with at least one of the following:
   application programming interface calls between an operating system and the first application; and
   application programming interface calls between the first application and a second application of the one or more analyzed applications.

* * * * *